2,651,241

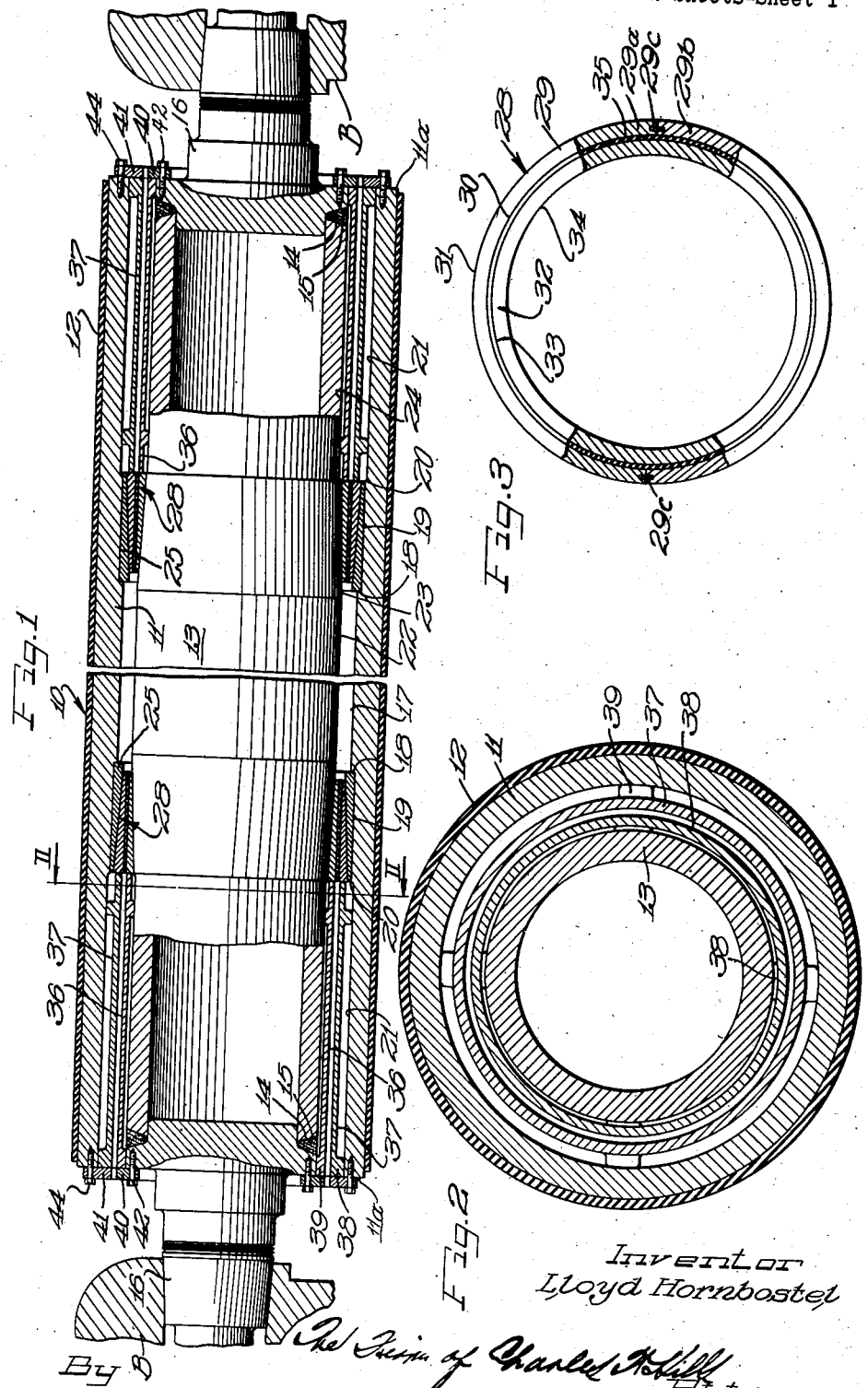
Sept. 8, 1953 — L. HORNBOSTEL — 2,651,241
ANTIDEFLECTION ROLL, METHOD OF ASSEMBLY, AND USE
Filed May 17, 1949 — 2 Sheets-Sheet 1
Inventor
Lloyd Hornbostel Sept. 8, 1953 L. HORNBOSTEL 2,651,241
ANTIDEFLECTION ROLL, METHOD OF ASSEMBLY, AND USE
Filed May 17, 1949 2 Sheets-Sheet 2
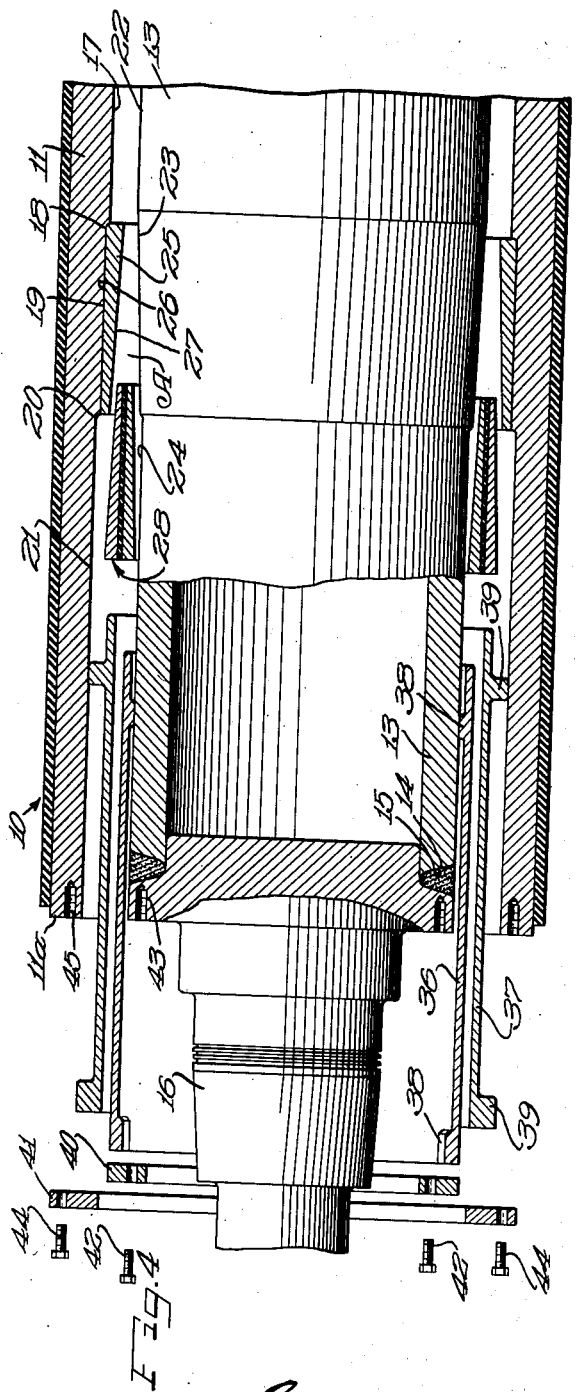
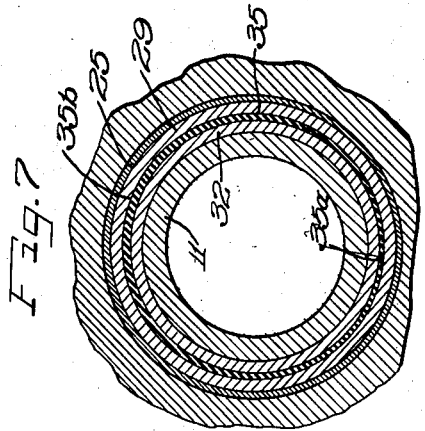
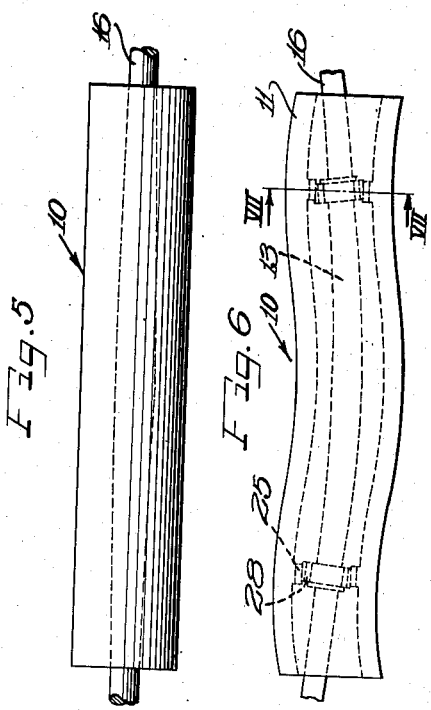
Inventor
Lloyd Hornbostel
By The Firm of Charles W. Hills
Attys Patented Sept. 8, 1953

UNITED STATES PATENT OFFICE 2,651,241

ANTIDEFLECTION ROLL, METHOD OF ASSEMBLY, AND USE

Lloyd Hornbostel, Beloit, Wis., assignor to Beloit Iron Works, Beloit, Wis., a corporation of Wisconsin Application May 17, 1949, Serial No. 93,651

11 Claims. (Cl. 92—73)

The present invention relates to an anti-deflection roll assembly and more particularly to a roll assembly capable of withstanding heavy loads causing deflection of the roll from a truly symmetrical configuration.

Specifically, the invention deals with a roll shell and through axle assembly joined together at longitudinally spaced areas by preloaded resilient material which is always under compressive stress even when the axle and shell are relatively deformed.

The anti-deflection roll assembly of the present invention is adaptable for use wherever resistance to high pressures or other extreme load conditions is necessary, and is particularly adapted for use in paper making machines, for example, as the bottom roll in a calender roll stack. In a calender roll stack, the bottom roll is subjected to the weight of the rolls thereabove and, since the bottom roll is not supported except at its ends, it deflects from a true symmetrical configuration because of the pressures placed thereon. The subjection of a roll assembly to such conditions also results in deflection of the shaft upon which the roll is mounted from a symmetrical contour. As a result of the concurrent deflection of both the shaft and the roll, the structure connecting the shaft to the roll is subjected to excessive stresses often causing failure of the prior art assemblies under operating conditions.

The present invention now provides an improved anti-deflection roll assembly which is capable of efficiently functioning under adverse conditions, such as those above outlined. The improved assembly of this invention includes a through shaft or axle carrying a cylindrical roll or shell mounted thereon for rotation therewith.

The shell is maintained in position upon the shaft by pairs of laminated frusto-conical compression collar rings. Each collar ring is composed of nested metal sleeves concentrically secured together by a rubber insert sleeve. The inner wall of the inner sleeve and the outer wall of the outer sleeve are tapered to fit on generally frusto-conical loading surfaces formed on the roll shaft and on the inner periphery of the roll shell. These loading surfaces are preferably provided by outer tapered portions of the axle and inner tapered portions of metal insert sleeves in the roll. The use of insert sleeves simplifies machining and fitting problems.

The outer compression sleeve of each collar is split or segmented for assembly on the rubber sleeve and the metal sleeves are vulcanized or otherwise bonded to the rubber sleeve.

The laminated collar assemblies are wedged between the loading surfaces of the axles and roll shell. End loading sleeves respectively secured to the axle and shell are provided to hold the collar assemblies in wedged condition in the roll.

Inasmuch as the laminated compression collar serves to join the shell to the shaft for rotation, it will be appreciated that the rubber layer interposed between the compression collar ring is subjected to stresses placed upon both the shell and the shaft. The compressed rubber layer is capable of absorbing the radial load imposed on the shaft by the weight of the shell and the external loading of the shell, the torque required to drive the roll, and also the shearing forces caused by the unequal deflection of the roll shaft and the shell when the roll is employed under adverse conditions similar to those hereinbefore outlined. Due to the distortion of the roll and the shaft, each portion of the rubber layer of the compression collar will be subjected to a maximum and a minimum shearing or flexing force during rotation of the roll. Inasmuch as the rubber layer has been initially subjected to compression, the resilient rubber layer is not subjected to an elongating force but is rather subjected to a varying compressive force. Accordingly, the useful operating life of the rubber layer is greatly enhanced by its subjection to only compressive stresses.

It is, therefore, an important object of the present invention to provide an improved anti-deflection roll having a shell carried on preloaded resilient material at spaced localized areas thereof.

Another important object of the present invention is to provide an anti-deflection roll including an external shell and a through shaft extending axially of the shell, the shell and shaft being connected by a compression collar placed under an initial stress during assembly of the roll and serving to absorb most of the stresses placed upon the roll.

A further important object of the present invention is to provide an improved anti-deflection roll assembly including a through shaft, an exterior cylindrical shell and means securing the shell to the shaft for rotation therewith, the securing means comprising a frusto-conical compression collar wedged into position between cooperating tapered surfaces of the shell and the shaft and being initially placed under stress to absorb forces developed upon rotation of the roll and deflection of the shell and the shaft from a truly symmetrical configuration.

Yet another important object of the present invention is to provide an improved means for securing a roll shell to a through shaft for rotation therewith, including a pair of concentric, generally frusto-conical compression rings and a resilient, compressible layer interposed between the rings, the compressible layer being placed under an initial compressive stress during assembly of the roll to absorb forces generated upon deflection of the roll from a truly symmetrical configuration without the subjection of the resilient layer to other than compressive forces.

It is a still further important object of the present invention to provide an improved anti-deflection roll for paper machinery and the like, including a cylindrical roll shell, a through shaft passing axially through the shell, and replaceable means for drivingly connecting the shell to the shaft, the replaceable connecting means serving to absorb forces to which the roll is subjected during its rotation and deflection from a symmetrical configuration, thereby prolonging the life of both the shell and the shaft.

Other and further important objects of this invention will be apparent from the disclosures in the specification and the accompanying drawings.

In the drawings:

Figure 1 is a broken vertical, sectional view, with parts shown in elevation, of an anti-deflection roll of the present invention;

Figure 2 is an enlarged sectional view taken along the plane II—II of Figure 1;

Figure 3 is an enlarged end elevational view, with parts broken away, of a compression collar of the roll of Figure 1;

Figure 4 is an enlarged, fragmentary, exploded sectional view of an end portion of the roll of Figure 1;

Figure 5 is a side elevational view of the roll of Figure 1;

Figure 6 is a view similar to Figure 5 illustrating greatly exaggerated distortion of the roll of Figure 5 when subjected to deflecting stresses; and Figure 7 is a greatly enlarged, sectional view taken along the plane VII—VII of Figure 6.

As shown on the drawings:

In Figure 1, reference numeral 10 refers generally to an anti-deflection roll assembly of the present invention. The roll 10 is of the type conventionally employed in paper making machinery, particularly in calender stacks, and includes a generally cylindrical roll shell 11 having a peripheral surface coating 12, formed of suitable metallic, fibrous, plastic, or rubber material. The shell 11 is mounted upon an axially extending, cylindrical through shaft 13 having its annular end faces 14 welded, as at 15, to stub shafts 16. The stub shafts 16 are adapted for journalling by suitable means (such as a bearing B) within the supporting framework (not shown) in which the roll 10 is employed.

The central portion 17 of the inner periphery of shell 11 is substantially cylindrical in contour and terminates in radially outwardly directed intermediate shoulders 18 defining annular recesses 19, of greater diameter than the central portion 17, extending axially from the shoulders 18 toward each annular end face of the shell 11. Each of the recesses 19 terminates in an additional radially outwardly directed shoulder 20 blending with an enlarged counterbore 21 extending axially inward of each annular end face 11a of the shell 11.

The shaft 13 is provided with a central section 22 of generally cylindrical outer peripheral contour, intermediate sections 23 having a frusto-conical outer periphery of axially outwardly decreasing diameter, and generally cylindrical terminal sections 24 joined at their extremities to the stub shafts 16 as hereinbefore described.

A metal loading sleeve 25 having a generally cylindrical outer periphery 26 and an inner frusto-conical periphery 27 of inwardly decreasing diameter is press-fitted in each of the recesses 19 of the inner periphery of the shell 11.

The adjacent outer peripheral frusto-conical surface 23 of the shaft 13 and the inner frusto-conical periphery 27 of the loading sleeve 25 cooperate to define an annular space A therebetween having an enlarged entrance mouth facing each end face 11a of the shell 11, the space A having an inwardly decreasing cross-sectional area.

A laminated compression collar unit 28 is mounted in each of the annular spaces A defined between the shell 11 and the shaft 13. As best shown in Figures 3 and 4 of the drawings, the compression collar 28 includes an outer annular collar ring 29 having a generally cylindrical inner peripheral face 30 and a tapered, generally frusto-conical outer peripheral face 31 of substantially the same taper and diameter as the frusto-conical inner periphery 27 of the loading sleeve 25. A second, inner compression collar ring 32 is concentric with, but of smaller outside diameter than the inner diameter of the outer ring 29. The inner ring 32 is provided with a generally cylindrical outer surface 33 and an inner tapered generally frusto-conical inner surface 34 of substantially the same taper and diameter as the outer frusto-conical peripheral surface 23 of the shaft 13.

A layer 35 of resilient, deformable material is confined between the cooperating cylindrical surfaces 30 and 33 of the concentric rings 29 and 32, respectively. The layer 35 is preferably initially formed of unvulcanized rubber which is vulcanized to the surfaces 30 and 33 of the rings 29 and 32 respectively following the assembly of the compression collar 28 as a whole.

As shown in Figure 3, the outer ring 29 is composed of a pair of semi-cylindrical segments 29a and 29b joined at their abutting edges by pins 29c extending into these edges. Due to the split construction of the outer ring, the compression collar may be easily assembled and following vulcanization of the rubber layer 35 to the rings 29 and 32 and assembly of the collar within the roll as later described, no separation of the split segments 29a and 29b of the ring 29 can occur.

As shown in Figure 4 of the drawings, the compression collar 28 is insertable into the space A defined by the cooperating frusto-conical surfaces 23 and 27 of the shaft 13 and the shell loading sleeve 25, respectively. The enlarged entrance mouth of the space A makes possible the ready assembly and disassembly of the compression collar 28 within the space A. Upon the assembly of the roll 10, the compression collar 28 is wedged into a space A between the cooperating frusto-conical surfaces with a considerable, predetermined amount of force, so that the compression collar rings 29 and 32 are actually distorted by being forced inwardly toward the layer 35, thus placing the resilient layer 35 therebetween under a compressive stress. The purpose of this compressive stress will be hereinafter more fully described, but it will be seen that such a stress is easily attained by reason of the cooperating tapered surfaces defining the annular space A and the exterior surfaces of the collar 28.

To maintain the collar 28 in position within the annular space A, and particularly to maintain the layer 35 of the collar under compressive stress, a pair of elongated, concentric, generally cylindrical holding sleeves 36 and 37 are provided for insertion within the annular space defined by the stub shaft 16 and the adjacent open end 11a of the shell 11. The inner compression collar holding sleeve 36 is provided with inwardly directed radial protuberances 38 for contacting the exterior periphery of the terminal shaft portion 24, while the outer compression collar holding sleeve 37 is provided with outwardly directed radial protuberances 39 contacting the inner periphery of the countersunk recess 21 of the shell 11. The sleeves 36 and 37 are of such length as to contact the outer ends of the compression collar sleeves 32 and 29, respectively, to maintain the compression collar tightly in position within the area A.

A pair of annular holding sleeve rings 40 and 41 are provided to abut the annular terminal ends of the sleeves 36 and 37, respectively. The inner holding sleeve ring 40 is secured to the stub shaft 16 by means of screws 42 threadedly received by threaded recesses 43 formed in the stub shaft end face, and the outer rings 41 are secured to the shell 11 by means of screws 44 threadedly received by threaded recesses 45 formed in the end faces 11a of the shell 11. It may thus be seen that the compression collar 28 is maintained in position within space A by the holding sleeves 36 and 37 which in turn are retained in position between the shaft 13 and the shell 11 by means of the holding sleeve rings 40 and 41, respectively, maintained in abutment against the stub shaft 16 and the shell end face 11a, respectively.

From the foregoing description, it will be seen that it would be difficult and costly to accurately machine the interior of the shell 11 and a corresponding portion of the shaft to such close tolerance that the tapered sleeves of the rubber sandwich, upon assembly of the roll, would be subjected to equal compressive forces, both at those surfaces contacting the layer 35 and at the surfaces contacting the tapered shell and shaft portions. In order to avoid the cost of such machining, the loading sleeves 25 are provided as a convenient, inexpensive means for insuring a close fit between the shell 11 and the outer compression collar ring 29 and between the tapered shaft section 23 and the inner compression collar ring 32.

Thus, in assembling the roll 10, the compression collars 28 are positioned on the tapered surfaces 23 of shaft 13 until a snug fit results with no preloading of the rubber. Then the loading sleeves 25 are positioned on the collar 28 until they, in turn, are just snug. The distance between the extreme ends of the loading sleeves 25 is then determined as mounted on the shaft 13 and the actual dimension between the shoulders 18 of the inner periphery of the roll 11 is determined by linear measurement. The sleeves 25 are then cut (at the inner or facing sleeve ends) so that the axial length of the sleeves plus the dimension between the shoulders 18 is equal to the dimension between the sleeves' extreme or outer ends as originally mounted upon the shaft. At the same time that the sleeves 25 are cut to length, the diameter of the outer periphery 26 of the sleeves 25 is machined to allow for a press fit of the sleeves into the recesses 19 of the inner periphery of the shell 11. The peripheral machining and the cutting of the sleeves to length may be easily accomplished by mounting the sleeves upon a tapered plug so that both operations may be performed simultaneously, as is well understood in the art.

As the next assembly steps, the sleeves 25 are press fitted into the recesses 19 in snug engagement with the shoulders 18, the shaft 13 is located centrally within the shell 11 and the compression collars 28 are inserted into the space A. The sleeves 36 and 37 are next utilized to move the compression collars 28 axially within the space A for a predetermined amount in order to obtain the calculated compression loading upon the resilient deformable layer 35 of the compression collar. A computed amount of compression loading of the resilient layer 35 may easily be obtained by properly adjusting the length of the holding sleeves 36 and 37.

The method of assembly hereinbefore described makes possible the wedged fitting of the compression collar within the space A and the preloading of the resilient layer 35 to a predetermined value without the expensive and time consuming machining operation which would otherwise be necessary.

The improved operating characteristics and the utility of preloading the rubber layer 35 of the compression collar 28 will be appreciated from Figures 5–7, inclusive, of the drawings. In Figure 5, the roll 10 is illustrated in an unloaded condition. It may be seen that the roll 10 is cylindrical and of a truly symmetrical configuration. Further, it will be observed that the shaft 16 passes axially through the cylindrical shell of the roll.

In Figure 6, the roll is illustrated as heavily loaded and distorted, the distortion being greatly exaggerated for purposes of illustration but in general following the contour of an actual roll employed as the bottom roll of a calender stack. It will be observed that both the shell 11 and the shaft 13 are distorted, the shaft being bowed symmetrically from its truly cylindrical shape and the shell being bowed downwardly at its central portion and adjacent each end portion while those portions intermediate the center and extreme end of the shell are maintained in substantially their original position due to the support for the shell 11 provided by the shaft 13.

In Figure 7, the distortion of the resilient layer 35 of the compression collar 28 may be seen. Due to the concurrent distortion of the shell 11 and the shaft 13, the greater compressive stress in the layer 35 will occur, as at 35a, at the lowest point on the periphery of the layer 35, while the least compressive stress will occur, as at 35b, at the highest point on the periphery of the layer 35. Inasmuch as the layer 35 has been subjected to compressive force by the distortion of the collar rings 29 and 32 during assembly of the roll 10, the layer 35 will still remain under compressive stress even at the point 35b. In other words, the amount of compressive stress applied to the layer 35 by distortion of the rings 28 and 32 during assembly of the roll is calculated to compressively load the layer sufficiently so that it will never be subjected to tension loads and will not even go to a neutral unloaded condition.

Because the rubber layer 35 is subjected to the radial load imposed by the weight of the roll 10 and its external loading, the torque required to drive the roll, and the shearing forces brought about by the unequal deflection of the shaft 13 and the shell 11 it is important that none of these forces place the rubber under tension.

Since the rubber always remains under compression, it will not be fatigued during repeated changes of compressive loading and it will have a longer wear life. In this manner, a large portion of those stresses heretofore applied to the roll structure itself, namely to the shell 11 and particularly to the shaft 13, are transmitted to the resilient or rubber layer 35 thus prolonging roll life. The compression collar may be easily replaced at a relatively small expense when its useful life has been expended and the economy obtained by employing the roll 10 of the present invention will be evident to those skilled in the art.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A roll assembly comprising a generally cylindrical, hollow outer shell, a through shaft extending axially of said shell, cooperating means on said shell and said shaft for defining an interior annular space adjacent each of the open end faces of said shell and of radially inwardly decreasing diameter, and means wedged within each of said spaces into engagement with said shell and said shaft, said means including nested concentric deformable metal sleeves and a resilient, rubber sleeve interposed therebetween, and said rubber sleeve being under preloaded compressive stress of sufficient magnitude to accommodate relative deformations of the shaft and shell without approaching a tension stress in any portion thereof.

2. A roll assembly comprising a shell, a through shaft extending axially of said shell, the inner periphery of said shell having a recess therein adjacent but inward from each end face thereof, a loading sleeve seated in each of said recesses and having an inner frusto-conical loading surface, said shaft having an exterior frusto-conical loading surface on each end thereof and aligned with the loading surface of said loading sleeve, and a laminated metal and rubber sleeve assembly inserted between the loading surfaces of said sleeve and said shaft, said assembly including outer concentric deformable metal sleeves having frusto-conical outer and inner peripheral surfaces for engagement with the loading surfaces of said sleeve and said shaft and an inner resilient sleeve interposed between said metal sleeves and means holding said assemblies in wedged deformed condition to compressively load the rubber.

3. A roll assembly comprising a cylindrical, hollow outer shell, a through shaft extending axially of said shell, the inner periphery of said shell having a recess therein adjacent each end face thereof, a loading sleeve seated in each of said recesses and having an inner frusto-conical loading surface, said shaft having an exterior frusto-conical loading surface adjacent each end thereof and aligned with the loading surface of said loading sleeve, and means including concentric deformable metal rings interposed between the loading surfaces of said loading sleeve and said shaft, a resilient layer interposed between said rings and capable of absorbing at least a portion of the stresses generated upon rotation of said roll assembly and deflection of said assembly from a truly cylindrical configuration, and means extending inwardly from the end faces of said shell to urge said rings into engagement with said loading surfaces.

4. A roll assembly comprising a generally cylindrical hollow exterior shell, a through shaft extending axially of said shell and having an exterior diameter less than the interior diameter of said shell, the inner periphery of said shell having a recess therein adjacent each open end thereof, a loading sleeve press fitted in each of the recesses of said shell and having a radially inwardly directed tapered loading surface of axially outwardly increasing diameter, said shaft having a frusto-conical loading surface adjacent each end thereof and aligned with the loading surface of said sleeve, said aligned loading surfaces cooperating to define an annular space therebetween of axially inwardly decreasing diameter, a compression collar including concentric metal rings having cooperating frusto-conical surfaces engaging the loading surfaces of said sleeve and said shaft and a resilient layer interposed between said rings and placed under compressive stress by the engagement of said rings with said sleeve and said shaft, a holding sleeve extending inwardly from each open face of said shell against the outer metal ring of the adjacent compression collar to urge the same into engagement with said loading surface of the shell and a second holding sleeve extending inwardly from each end portion of the shaft against the inner metal ring of the adjacent collar to urge the same into engagement with the loading surface of the shaft.

5. The method of mounting laminated metal and rubber sleeve assemblies to join an internally shouldered roll shell with a through axle having spaced tapered mounting surfaces which comprises snugly seating the inner metal sleeve of each assembly on said axle surfaces, snugly seating metal loading sleeves upon the outer metal sleeves of each thus seated assembly, removing those portions of the loading sleeve extending axially inwardly and radially outwardly so as to permit the loading sleeve to be so positioned that, while press-fit in the shouldered roll shell, they may also be snugly seated upon the outer metal sleeve of each thus seated assembly, removing the cut loading sleeves from the laminated assemblies, removing the laminated assemblies from the axle, press-fitting the loading sleeves into the shell against the shoulders therein, inserting the axle into the shell, and wedging the laminated assemblies between the loading sleeves and axle.

6. The method of uniting an axle to a roll shell which comprises snugly seating laminated metal and rubber collar assemblies on spaced tapered surfaces near the ends of the axle, snugly seating loading sleeves on the thus seated collar assemblies, providing sleeve bottoming shoulders in the shell, removing predetermined amounts of the inwardly axially extending portions and the radially outwardly extending portions of the loading sleeve to so shape the loading sleeves that they are adaptable for press-fit cooperation with the sleeve bottoming shoulders in the shell while also being thus snugly seated upon the outer metal sleeves of each thus seated assembly, removing the collars and sleeves from the axle, pressing the sleeves into the shell against the shoulders, centering the axle in the shell, and wedging the collars between the press-fitted sleeves and the tapered axle surfaces.

7. A method of supporting a load that comprises rotating a roll shell axially receiving a through shaft for co-rotatably supporting the shell, supporting the shell on the shaft with annular resilient rubber collars interposed between the shell and the shaft, applying the load transversely to the rotating shell and shaft to effect different deflections in each, and during such rotation and load application, continuously applying compressive forces to said collars of sufficient strength to maintain said collars in radially preloaded compression throughout the periphery thereof.

8. A method that comprises rotating a roll shell axially receiving a through shaft for co-rotatably supporting the shell, applying a transverse load to the shell of sufficient size to deflect the shell and the shaft to a different extent, providing annular rubber collars on the shaft for resiliently supporting the shell thereon, and continuously applying compressive forces to said collars of sufficient strength to maintain said collars in radially preloaded compression throughout the periphery thereof during rotation.

9. A roll assembly comprising a generally cylindrical, hollow outer shell, a through shaft extending axially of said shell, cooperating means on said shell and said shaft for defining an interior annular space adjacent each of the open end faces of said shell and of radially inwardly decreasing diameter, and means wedged within each of said spaces into engagement with said shell and said shaft, said means including nested concentric deformable metal sleeves and a yieldable annulus of resilient elastomeric material interposed between said sleeves.

10. A roll assembly comprising a cylindrical, hollow outer shell, a through shaft extending axially of said shell, the inner periphery of said shell having a recess therein adjacent each end face thereof, a loading sleeve seated in each of said recesses and having an inner frusto-conical loading surface, said shaft having an exterior frusto-conical loading surface adjacent each end thereof and aligned with the loading surface of said loading sleeve, and means including concentric deformable metal rings interposed between the loading surfaces of said loading sleeve and said shaft, a solid resilient annulus of yieldable flexible material interposed between said rings, and means extending inwardly from the end faces of said shell to urge said rings into engagement with said loading surfaces.

11. A method of calendering paper that comprises rotating a roll shell axially receiving a through shaft for co-rotatably supporting the shell, supporting the shell on the shaft with annular resilient rubber collars interposed between the shell and the shaft, pressing a traveling paper web at a press nip defined by a press roll and said roll shell whereby there is applied a load transversely to the rotating shell and shaft to effect different deflections in each, and during such rotation and load application, continuously applying compressive forces to said collars of sufficient strength to maintain said collars in radially preloaded compression throughout the periphery thereof.

LLOYD HORNBOSTEL.

References Cited in the file of this patent

UNITED STATES PATENTS

| Number | Name | Date |
|---|---|---|
| 886,998 | Love | May 5, 1908 |
| 1,130,409 | Kirk | Mar. 2, 1915 |
| 1,413,436 | Vedder | Apr. 18, 1922 |
| 1,430,418 | Vedder | Sept. 26, 1922 |
| 1,619,371 | Rogers et al. | Mar. 1, 1927 |
| 1,938,995 | Beynon | Dec. 12, 1933 |
| 2,001,257 | Lecler | May 14, 1935 |
| 2,346,574 | Guy | Apr. 11, 1944 |
| 2,367,088 | Benson | Jan. 9, 1945 |
| 2,477,874 | Hudson | Aug. 2, 1949 |

FOREIGN PATENTS

| Number | Country | Date |
|---|---|---|
| 296,776 | Great Britain | Oct. 10, 1929 |
| 364,310 | Great Britain | Jan. 7, 1932 |